(12) United States Patent
Lanzi et al.

(10) Patent No.: US 11,299,354 B2
(45) Date of Patent: Apr. 12, 2022

(54) ORIENTING DEVICE AND A METHOD FOR ORIENTING AN OBJECT

(71) Applicant: SIDEL S.p.A., Parma (IT)

(72) Inventors: Mauro Lanzi, Parma (IT); Andrea Frosi, Parma (IT)

(73) Assignee: SIDEL SPA, Parma (IT)

(*) Notice: Subject to any disclaimer, the term of this patent is extended or adjusted under 35 U.S.C. 154(b) by 0 days.

(21) Appl. No.: 17/047,096

(22) PCT Filed: Apr. 2, 2019

(86) PCT No.: PCT/EP2019/058230
§ 371 (c)(1),
(2) Date: Oct. 13, 2020

(87) PCT Pub. No.: WO2019/197205
PCT Pub. Date: Oct. 17, 2019

(65) Prior Publication Data
US 2021/0147157 A1    May 20, 2021

(30) Foreign Application Priority Data

Apr. 13, 2018  (EP) ..................................... 18167247

(51) Int. Cl.
*B65G 47/244*  (2006.01)
*B65G 43/08*  (2006.01)

(52) U.S. Cl.
CPC ......... *B65G 47/2445* (2013.01); *B65G 43/08* (2013.01); *B65G 2203/042* (2013.01); *B65G 2207/14* (2013.01)

(58) Field of Classification Search
CPC ................ B65G 47/2445; B65G 43/08; B65G 2203/042; B65G 2207/14
(Continued)

(56) References Cited

U.S. PATENT DOCUMENTS

| 5,350,051 A * | 9/1994 | Cooper | A24C 5/325 |
|---|---|---|---|
| | | | 198/396 |
| 11,034,534 B2 * | 6/2021 | Beer | B65G 65/02 |
| 2017/0314175 A1 * | 11/2017 | Hirayama | D05B 35/00 |

FOREIGN PATENT DOCUMENTS

| EP | 0486043 A1 * | 5/1992 | ........... B65G 47/244 |
|---|---|---|---|
| EP | 0486043 A1 | 5/1992 | |

(Continued)

OTHER PUBLICATIONS

EP0298019b1_trsltn.pdf, May 20, 1992.*
International search report dated Jun. 6, 2019.

*Primary Examiner* — Gene O Crawford
*Assistant Examiner* — Lester Rushin, III (57) ABSTRACT

Disclosed is device for orienting at least one object, comprising: a fixed frame, conveying means defining a conveying surface to contact a bottom portion of object and convey object along a first direction; and rotating means selectively actuatable for creating on bottom portion a differential speed causing the rotation of object about a first axis transversal to first direction. The rotating means comprise a contact element that is fixed or movable along first direction with a differential speed relative to conveying means. The contact element is selectively movable with respect to conveying surface between: a first configuration, protruding from conveying surface along first axis, so as to contact bottom portion of object and to cause the rotation of object about first axis; and a second configuration, offset from conveying surface along first axis. The contact element is free to oscillate around a second axis parallel to first direction.

12 Claims, 8 Drawing Sheets

(58) Field of Classification Search
USPC .......................................................... 198/415
See application file for complete search history.

(56) References Cited

FOREIGN PATENT DOCUMENTS

| | | | | |
|---|---|---|---|---|
| EP | 3075686 | A1 | 10/2016 | |
| EP | 3305691 | A1 * | 4/2018 | ............. B65G 47/54 |
| FR | 3101073 | A1 * | 3/2021 | ............. B65G 47/31 |

* cited by examiner

FIG. 12

ORIENTING DEVICE AND A METHOD FOR ORIENTING AN OBJECT

The present invention relates to an orienting device for orienting an object.

The present invention also relates to a method for orienting an object.

In greater detail, the objects can be crates, boxes, cartons, packs of groups of articles, especially containers for edible substances.

The groups have generally a rectangular base, with a side smaller than the other side.

The orienting device can be incorporated in a bottling line for forming labelled and filled containers and for palletizing them.

Bottling lines are known which comprise, among other things, a rinsing unit for rinsing the containers, a filling unit for filling the containers, a capping unit for capping the containers and a packaging unit for packaging together a given number of containers, so as to form a plurality of groups of containers.

The bottling line further comprises a palletizing station fed with the group of containers and outputting a layer of groups, which will be stacked by manipulating means so as to form a pallet.

The formation of the layer often requires that some groups of containers are turned of 90 degrees about a vertical axis.

An orienting device aimed to rotate the group of containers of 90 degrees is known from WO-A-2016156753.

In greater detail, the known orienting device comprises:
a conveying surface for conveying the groups of containers along a first horizontal direction; and
a rotating device for creating a differential speed along the horizontal direction in the bottom of the groups, so as to cause the rotation of the group about the vertical axis.

The rotating device comprises a peg stationary with respect to the conveying surface along the first direction and movable parallel to the vertical axis, so as to contact a portion of the bottom of the group. In this way, this portion is slowed down with respect to the remaining part and the group is rotated about the vertical axis.

Even if well performing, the known orienting device leaves room for an improvement.

In greater detail, the peg and the group contact with one another along a substantially punctual zone, which corresponds to the circular area of the peg.

As a result, there is a risk that the some of the groups are not completely rotated for ninety degrees, especially at high processing speed. This risk is increased when the bottom of the containers is not flat but has only limited contact areas, as in the case of containers with uneven bottom, e.g. a petaloid bottom.

A need is therefore felt within the sector to increase the reliability of the operation of the orienting device and the speed at which the orienting device can properly orient the groups.

Still more precisely, a need is felt within the industry to ensure a complete rotation of 90 degrees, especially with groups formed by containers having relative bottoms unevenly shaped, e.g shaped as a petaloid.

It is an object of the present invention to provide an orienting device for orienting an object, which meets the above requirements.

The aforementioned object is achieved by the present invention as it relates to an orienting device for orienting an object, as claimed in claim 1.

The present invention also relates to an orienting device for orienting an object, as claimed in claim 16.

The present invention also relates to a method of orienting a product, as claimed in claim 17.

The present invention also relates to a method of orienting a product, as claimed in claim 19.

One preferred embodiment is hereinafter disclosed for a better understanding of the present invention, by way of non-limitative example and with reference to the accompanying drawings, in which.

With reference to FIGS. 1 to 6, reference numeral 1 indicates an orienting device for orienting a plurality of objects 2.

In the embodiment shown, objects are groups 2 of containers, in particular containers for an edible product.

Alternatively, the objects could be crates, boxes, cartons or packs containing containers.

In the embodiment shown, each group 2 is rectangular shaped with two smaller sides 17 and two larger sides 18.

Orienting device 1 is adapted to be incorporated in an end station 3 for forming a not shown pallet of objects 2 by means of not shown manipulating means.

In greater detail, the pallet of groups 2 comprises a plurality of superimposed layers. The formation of the layers requires that the manipulating means are fed with groups 2 in a particular configuration.

In particular, the formation of the layers requires that at least some of groups 2 are oriented in a given configuration upstream of the manipulating means.

Figure 1:
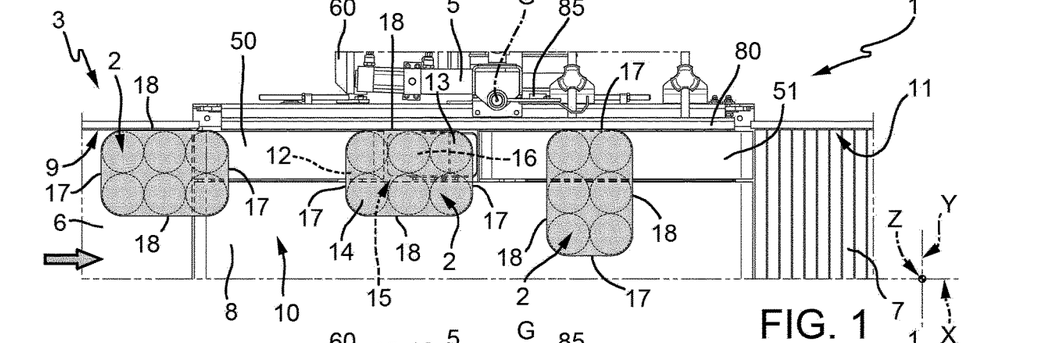
FIGS. 1 to 4 schematically show top views of different operative orients of an orienting device in accordance with the present invention, with reference to a smaller size group, with parts removed for clarity and while orienting a first format of objects.
Figure 2:
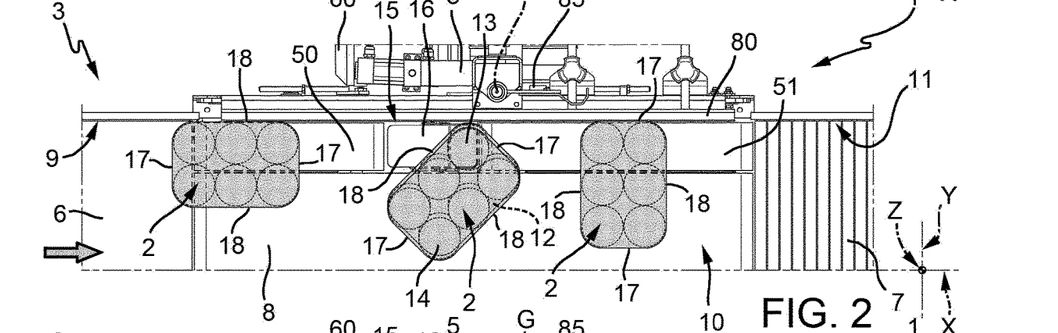
Figure 3:
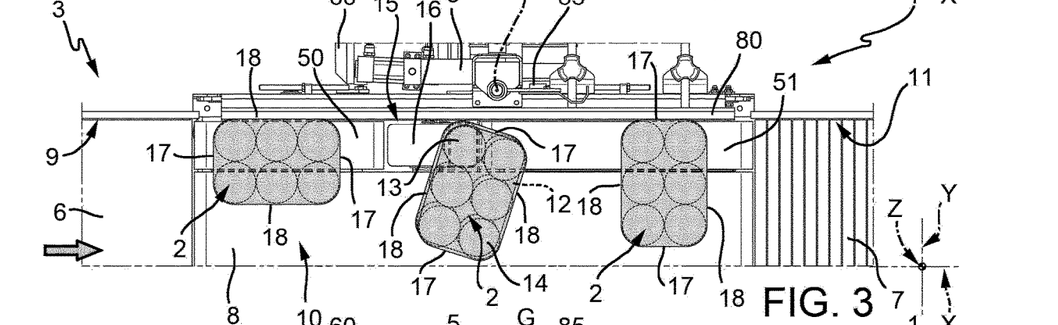
Figure 4:
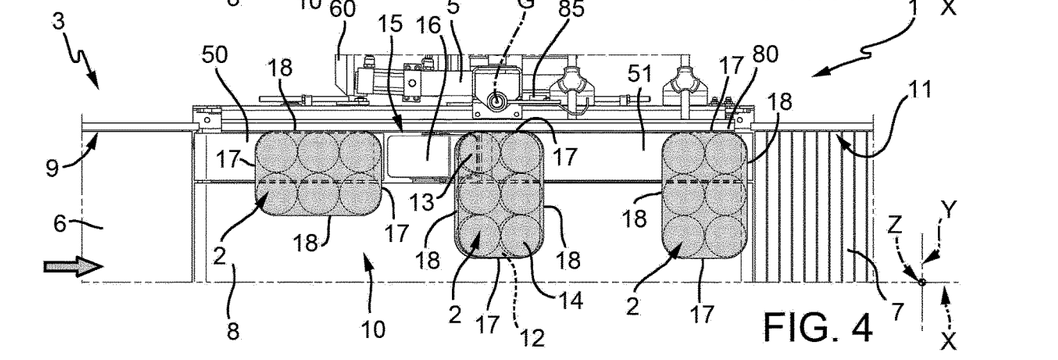
Figure 5:
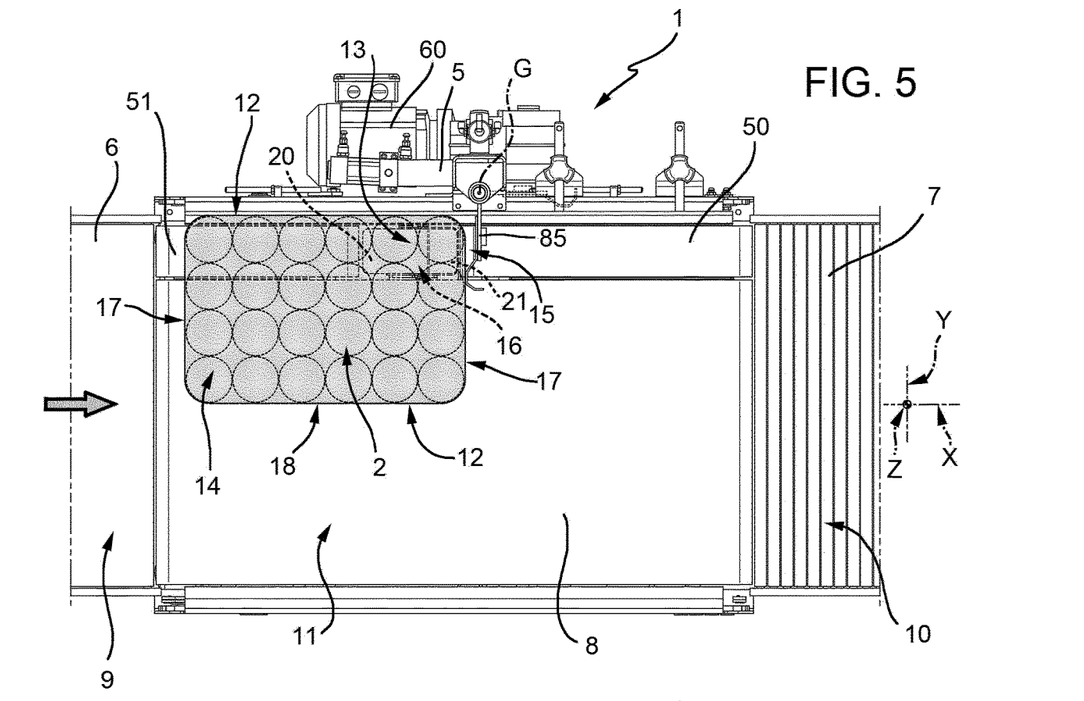
FIGS. 5 and 6 are schematic top view of respective operative orients of the orienting device of FIGS. 1 to 4, with reference to a larger size groups, with parts removed for clarity and while orienting a second format of objects.
Figure 6:
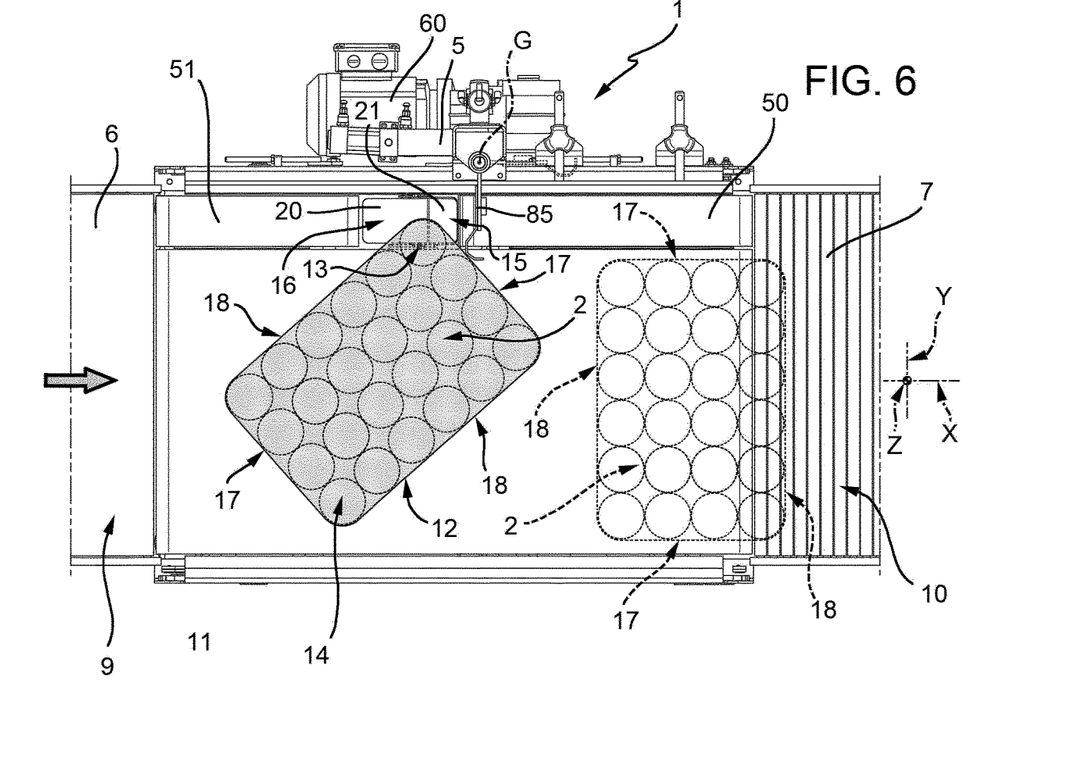

Groups 2 can have a smaller format (FIG. 1 to 4) or a larger format (FIGS. 5 and 6).

Orienting device 1 substantially comprises:
a frame 5;
an infeed conveyor 6 for advancing groups 2 to be oriented along a direction X, horizontal in the embodiment shown;
an outfeed conveyor 7 for advancing oriented groups 2 along direction X and towards the manipulating means; and
a conveyor 8, which is interposed between infeed and outfeed conveyors 6, 7.

Conveyors 6, 7, 8 comprise respective conveying surfaces 9, 10, 11 onto which a bottom surface 12 of groups 2 are advanced along direction X.

It is also possible to identify a direction Y, which is orthogonal to direction X.

Conveying surface 9, 10, 11 lie on respective planes defined by directions X, Y.

Orienting device 1 further comprises a rotating group 15 selectively actuatable for creating on bottom surface 12 of advancing groups 2 a differential speed. This differential speed causes the rotation of groups 2 about an axis Z.

In the embodiment shown, axis Z is orthogonal to directions X, Y and has a vertical extension.

Still more precisely, the actuation of rotating group 15 causes the rotation of groups 2 of ninety degrees about axis Z—in anticlockwise direction with reference to the embodiment shown in FIGS. 1 to 4—and from a first position in which sides 17, 18 are parallel respectively to direction Y, X to a second position in which sides 17, 18 are parallel respectively to direction X, Y.

In the embodiment shown, rotating group 15 slows down a portion 13 of bottom surface 12 of groups 2 to be rotated with respect to the remaining portion 14, thus causing a torque parallel to axis Z and acting on group 2.

Rotating group 15 comprises a pad 16, which is stationary with respect to direction Z.

Pad 16 is selectively movable with respect to conveying surface 11 between:
a first configuration (FIG. 10), in which it contacts portions 13 of bottom surfaces 12 of groups 2 advancing along direction X, so as to slow down portions 13 and to cause the rotation of these groups 2 about axis Z; and
a second configuration (FIG. 9), in which it remains offset from bottom surfaces 12 of groups 2 advancing along direction X, without causing any rotation thereof.

In detail, portion 13 is smaller than portion 14 and correspond to the area of bottom surface 12 in contact at given time with pad 16 set in the first configuration.

As soon as bottom surface 12 contacts pad 16, portion 13 defines a lateral strip of bottom surface 12 (FIG. 1) defined by one of the sides 17, 18 arranged extending parallel to direction X. As the rotation of groups 2 proceeds, relative portion 13 corresponds to respective corners of bottom surface 12.

In greater detail, pad 16 is arranged laterally to conveying surface 11 of conveyor 8 with respect to direction Y.

In the embodiment shown, abutting pad 16 is a made in high friction material, in particular a PVC coating.

Furthermore, pad 16 has a length parallel to direction X and a width parallel to direction Y.

Advantageously, pad 16 is free to oscillate about an axis A parallel to direction X.

Figure 11:
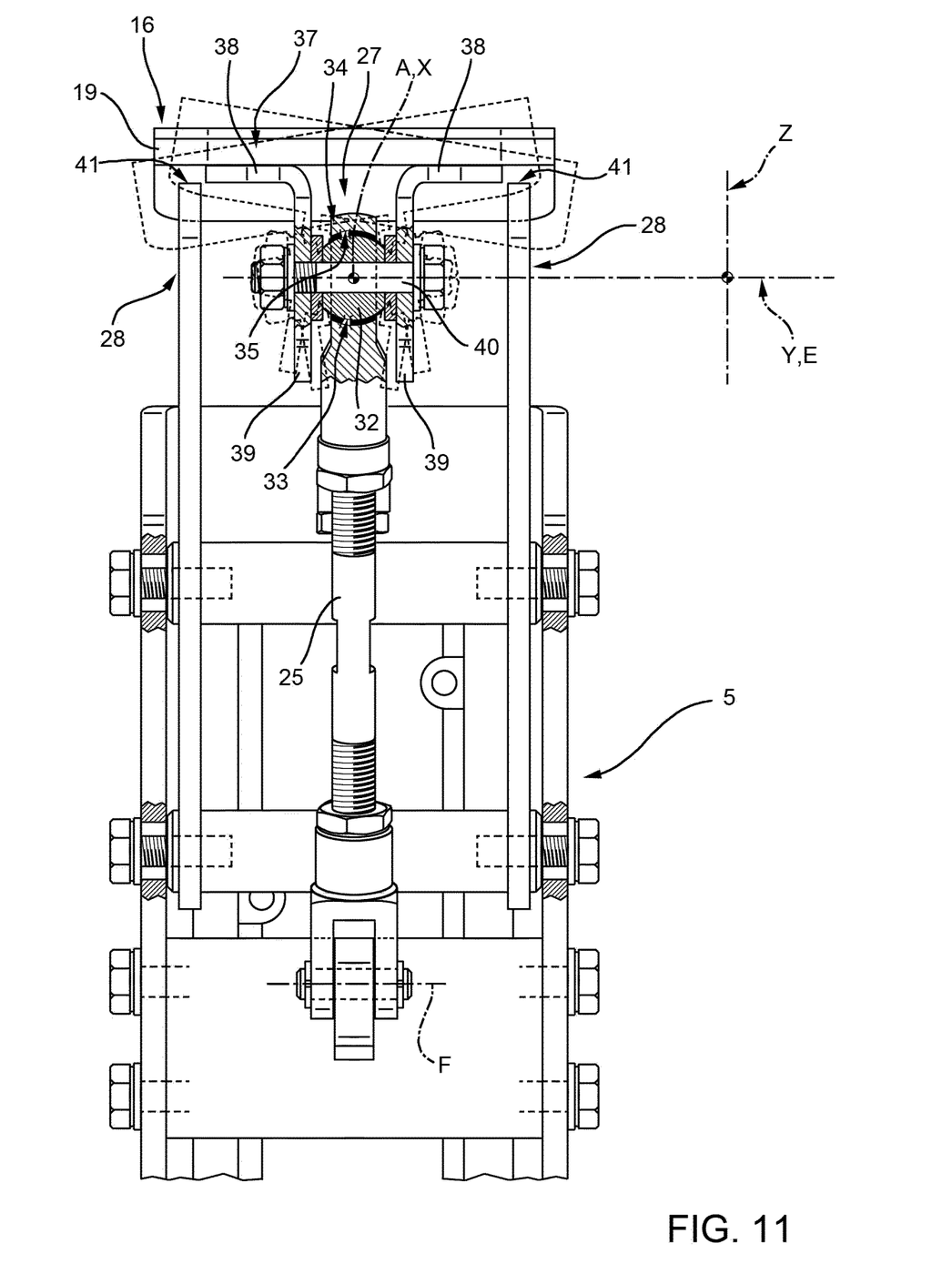
FIG. 11 is an enlarged-scale section taken along XI-XI of FIG. 9, with parts removed for clarity.

Still more precisely, group 2 instantaneously resting on pad 16 causes the oscillation of pad 16 set in the first configuration about axis A, as shown in FIG. 11.

In greater detail, pad 16 comprises a first and a second portion 20, 21 sloped with one another.

Portion 20 is longer than portion 21. Portion 20 is arranged upstream of portion 21, with reference to the advancing direction of conveying surface 11.

When pad 16 is set in the first configuration (FIG. 10), portion 20 is ascending with reference to the advancing direction of conveying surface 10 and portion 21 lies on a plane defined by directions X, Y. In particular, both portions 20, 21 protrude from conveying surface 11 with respect to axis Z.

When pad 16 is set in the second configuration (FIG. 9), portion 20 lies on the plane defined by directions X, Y, and portion 21 is descending with reference to the advancing direction of conveying surface 10. In particular, portion 21 extends as of portion 20 towards the opposite side of conveying surface 11.

In greater detail, rotating group 15 comprises (FIGS. 9 and 10):
a lever 19, which is fixed to pad 16;
a motor 22, which drives in rotation a shaft 26 parallel to direction Y;
a lever 23 extending parallel to axis Z, hinged to lever 19 about an axis B orthogonal to axis A and parallel to direction Y; and
a lever 24 hinged to lever 23 about an axis C parallel to axis B and rotating about an axis D parallel to axis A and eccentric with respect to shaft 26.

Figure 9:
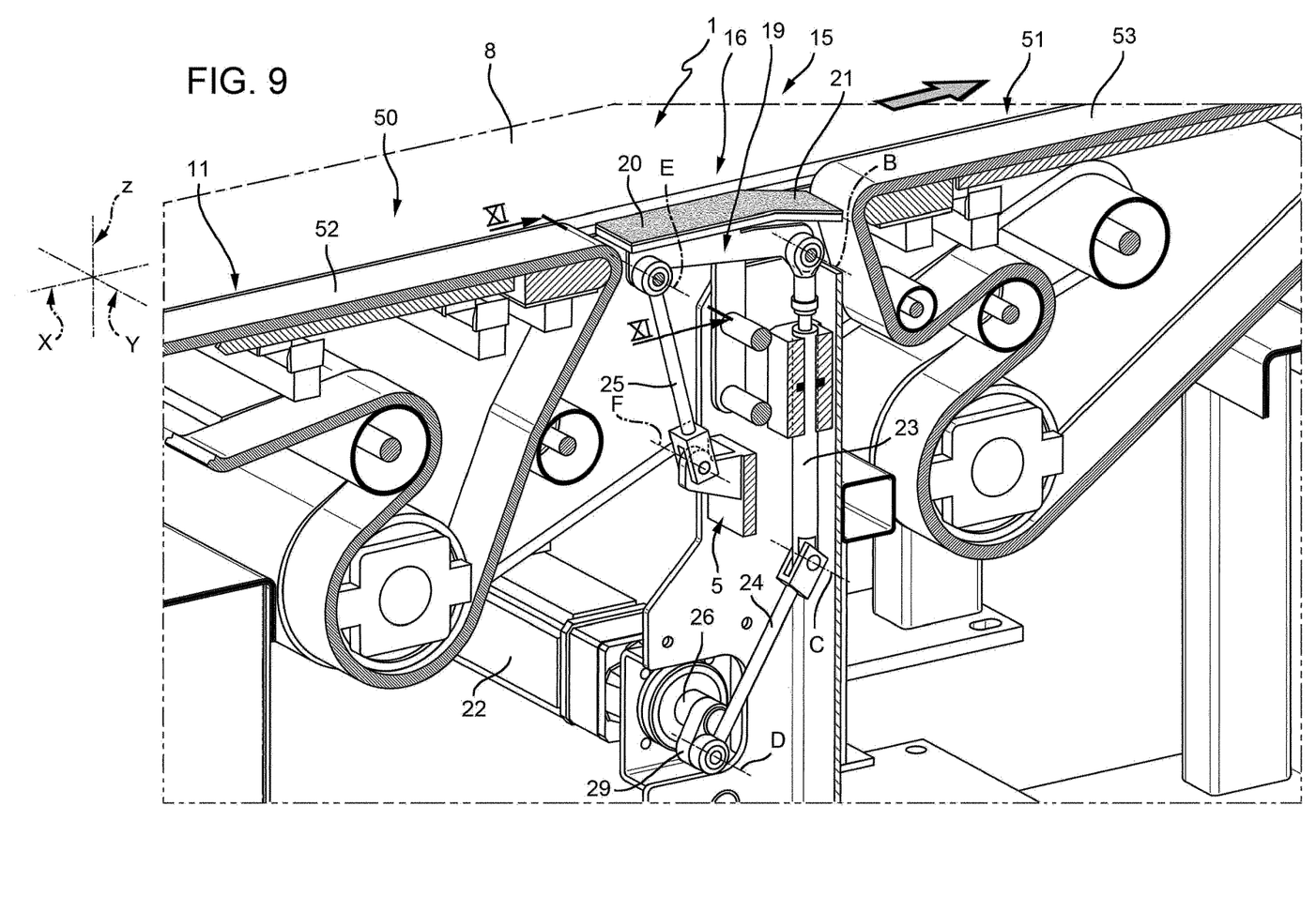
FIGS. 9 and 10 show in a further enlarged view respective configurations of the orienting device of FIGS. 1 to 8.
Figure 10:
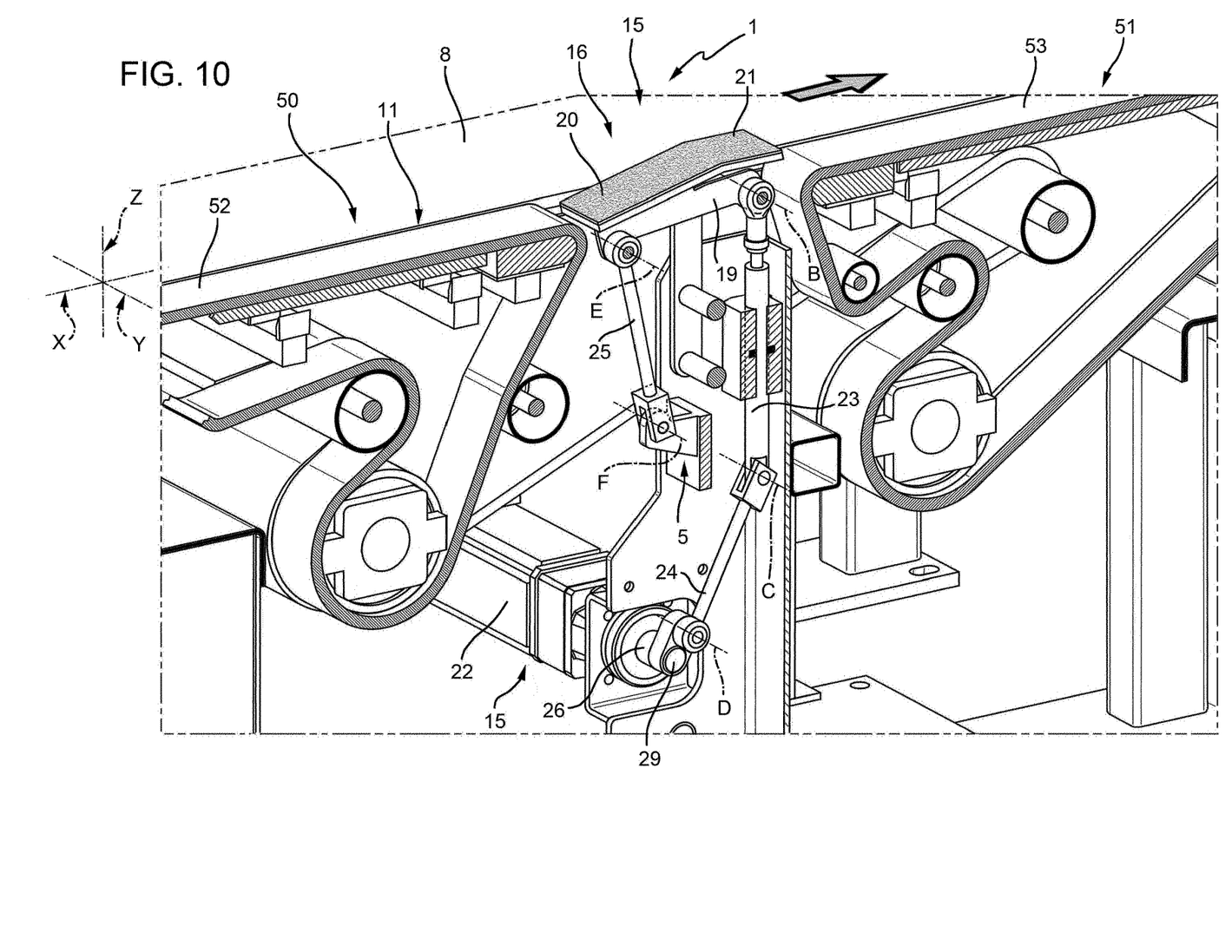

Still more precisely, rotating group 15 comprises a connecting element 29 interposed between shaft 26 and lever 24.

Rotating group 15 also comprises a lever 25 hinged to lever 19 and frame 5 about respective axes E, F parallel to axes B, C.

In particular, lever 25 is hinged to lever 19 in correspondence of portion 20 of pad 16 and lever 23 is hinged to lever 19 in correspondence of portion 21 of pad 16.

In the embodiment shown, motor 22 is an electric motor, e.g. a brushless motor.

Rotating group 15 also comprises (FIG. 11):
a pair of joints 27, which are interposed between frame 5 and pad 16 to allow the rotation of pad 16 around axis B; and
a pair of stop walls 28, which have an adjustable position along axis Z and contact pad 16, so as to contain the oscillation of pad 16 about axis A within a desired value.

Joints 27 allow pad 16 both to rotate about respective axes B, E with respect to levers 23, 25 respectively and to oscillate about axis A with respect to frame 5.

In greater detail, each joint 27 comprises, in turn:
a body 32 with an at least partially spherical surface 33; and
a seat 34 having an at least partially spherical surface 35 and housing body 32.

Body 32 of each joint 27 is integral with pad 16.

Seats 34 of joints 27 are defined by respective ends of levers 23, 25.

Rotating group 15 also comprises a pair of curved bars 37 fixed to pad 16 and connected to one another.

Still more precisely, bars 37 comprise respective horizontal portions 38 fitted to a bottom surface of pad 16 and respective vertical portions 39.

Portions 39 are connected to one another by means of a bolt 40 passing through seat 34 and extending orthogonally to direction Y. In this way, portions 39 and body 32 are made integral with one another.

Stop walls 28 lie on relative planes orthogonal to direction Y and are arranged on respective opposite lateral sides of pad 16 and levers 23, 25.

Furthermore, stop walls 28 define respective abutting surfaces 41 aimed to stop the oscillation of pad 16 around axis A.

Stop walls 28 are fixed to frame 6 in a plurality of orients parallel to axis Z, so as to locate surfaces 37 in a plurality of adjustable positons parallel to axis Z.

Orienting device 1 further comprises a pair of conveyors 50, 51 (FIGS. 9, 10 and 12), which are arranged on the same lateral side of conveyor 8. In particular, pad 16 is interposed between conveyors 50, 51 along direction X.

Conveyors 50, 51 define respective conveying surfaces 52, 53 for portion 13 of bottom surface 12 of groups 2. Surfaces 52, 53 are arranged respectively upstream and downstream of pad 16, proceeding parallel to the advancing direction of groups 2 along direction X.

In the embodiment shown, conveying surfaces 52, 53 advance with the same speed parallel to direction X.

Alternatively, conveying surfaces 52, 53 advance with respective speeds different from one another parallel to direction X.

Figure 12:
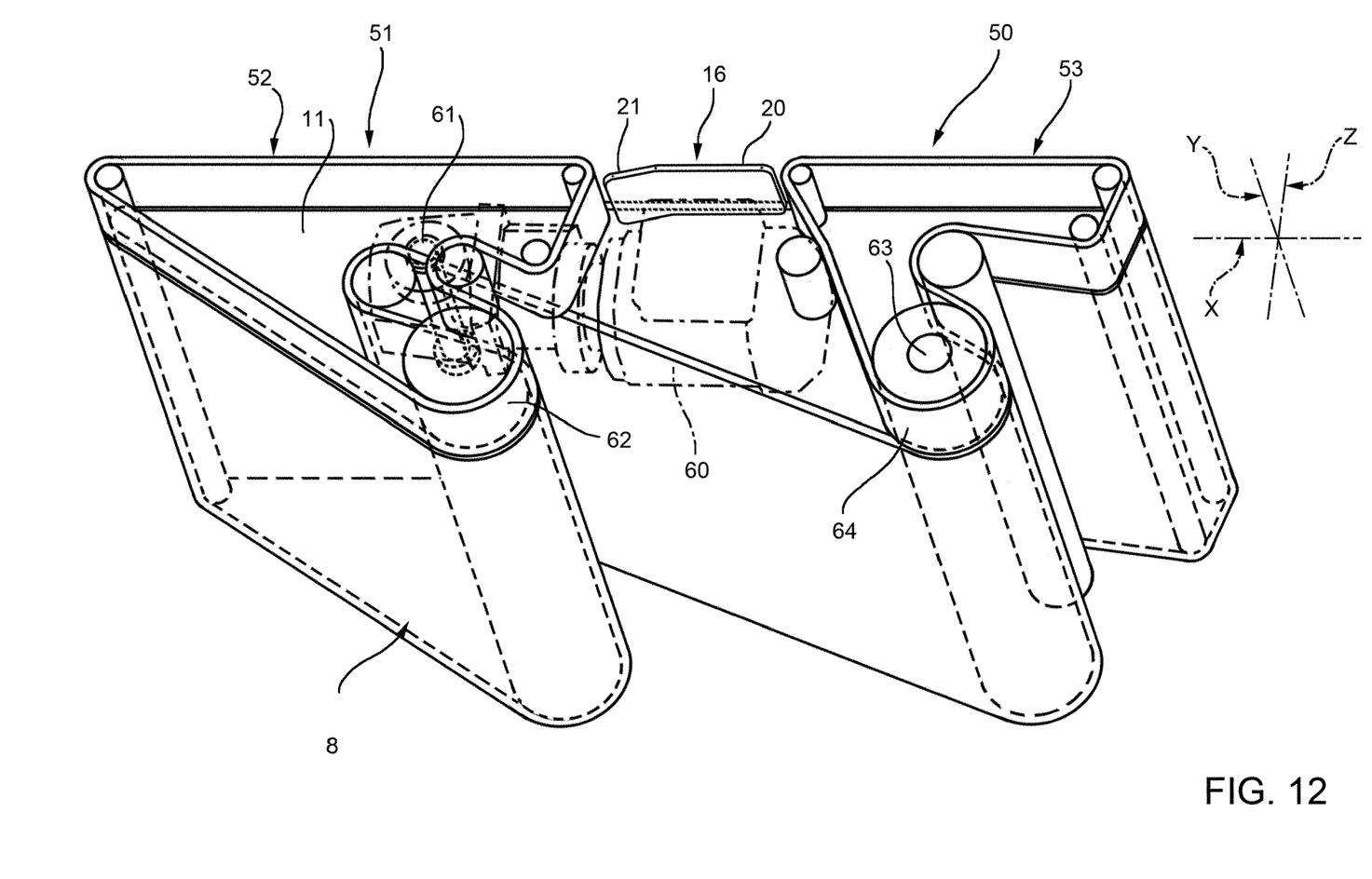
FIG. 12 is a perspective enlarged view of further components of the orienting device of FIGS. 1 to 11, with parts removed for clarity.

Orienting device 1 further comprises (FIG. 12):

a motor 60;

a shaft 61 driven in rotation by motor 60 and driving in rotation, by means of a plurality of pulleys 62 (only one of which is shown in FIG. 12), conveyor 51 and conveyor 8; and a shaft 63 onto which a plurality of pulleys 64 (only one of which is shown in FIG. 12) are fitted.

Conveyors 8 and 50 are wound onto pulleys 64.

Figure 7:
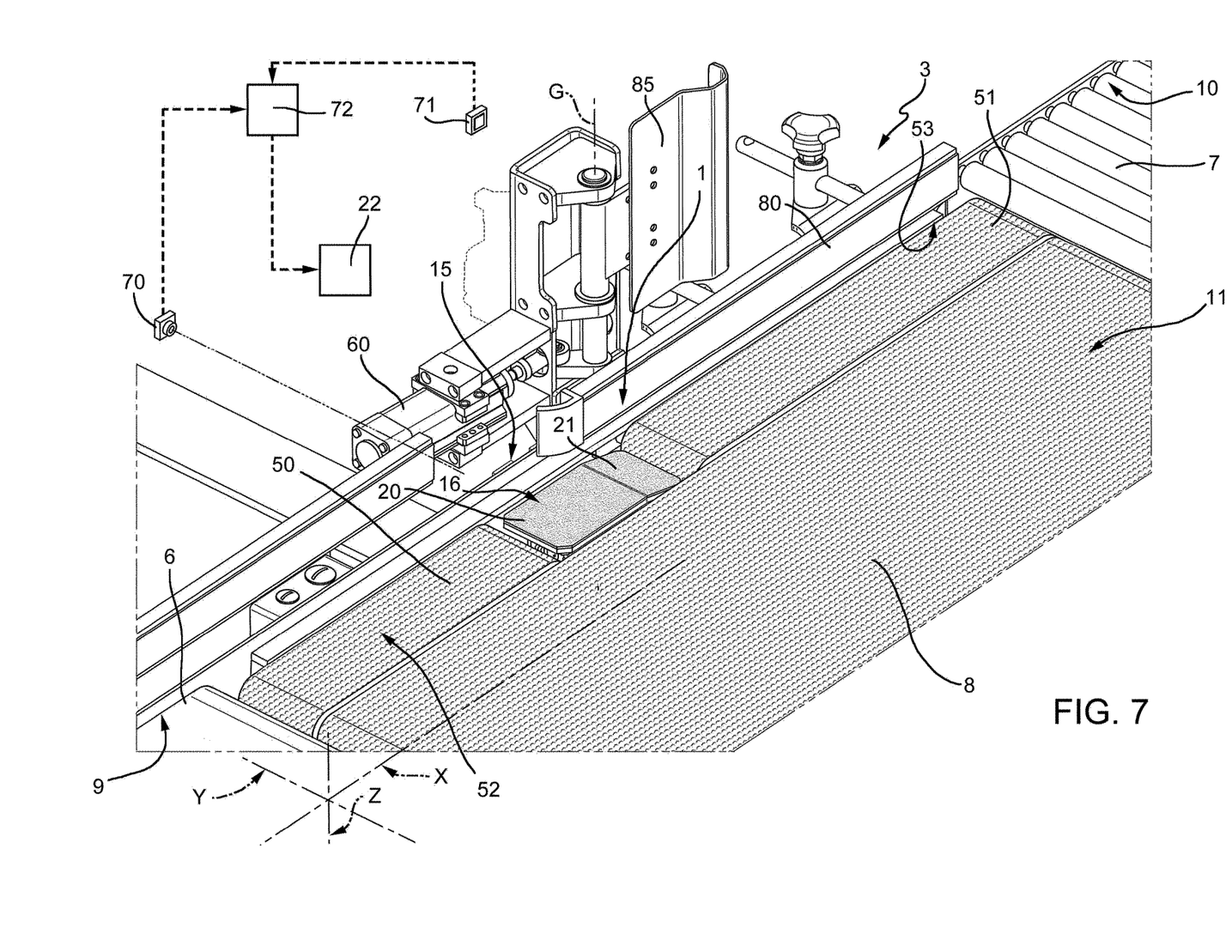
FIG. 7 is a perspective view in an enlarged scale of the orienting device of FIGS. 1 to 6, with parts removed for clarity.
Figure 8:
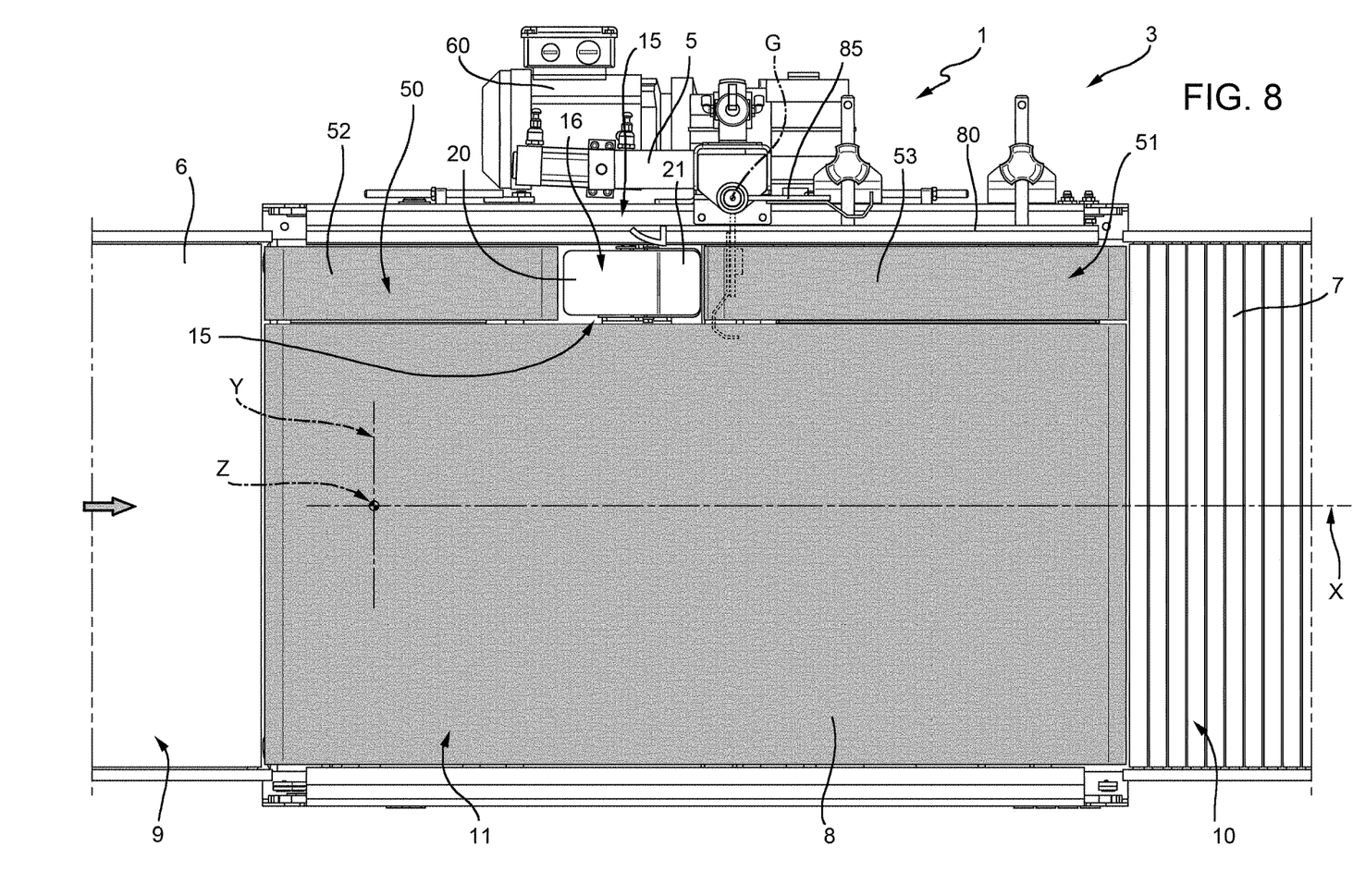
FIG. 8 is a top view of the orienting device of FIG. 7, with parts removed for clarity.

Orienting device 1 further comprises (FIG. 7):

a sensor 70, a photo-cell in the embodiment shown, for generating a first signal associated to the angular position of groups 2 travelling on conveyors 8, 50 relative to axis Z and upstream of pad 16;

a sensor 71, e.g. a video-camera or a 3-D sensor or a photocell, for generating a second signal associated to the angular position of groups 2 contacting pad 16 relative to axis Z; and a control unit 72 functionally connected with motor 22 programmed for displacing pad 16 from the second configuration to the first configuration on the basis of the first signal, and for displacing pad 16 from the first configuration to the second configuration on the basis of the second signal.

Furthermore, orienting device 1 comprises (FIG. 7) a guide 80, which has a prevalent extension parallel to direction X and is stationary.

Guide 80 is fitted to frame 5 and is arranged on the lateral side of pad 16 opposite to conveyor 8.

Guide 80 is adapted to ease the rotation of groups 2.

Finally, orienting device 1 comprises a deviator 85 which can be selectively set:

in a first position (FIGS. 1 to 4), in which it remains spaced from groups 2 advancing along direction X on conveyor 8; or in a second position (FIGS. 5 to 6), in which it contacts groups 2 advancing along direction X downstream of pad 16 and in an position spaced from conveyors 8, 51 along direction Z, so as to ease the rotation of groups 2.

In particular, deviator 85 is set in the second position, when groups 2 have a larger format and when pad 16 is in the first configuration.

In the embodiment shown, deviator 85 is hinged to frame 6 about an axis G parallel to axis Z. Axis G is set downstream of pad 16 along direction X proceeding parallel to the advancing direction of groups 2 along direction X, and on the opposite side of guide 80 with respect to conveyors 50, 51.

The operation of orienting device 1 is hereinafter described at first with reference to groups 2 having the smaller format (FIGS. 1 to 4). In this condition, deviator 85 is in the second position.

The operation of orienting device 1 is also hereinafter described starting from a condition in which pad 16 is in the second configuration. In this condition, pad 16 does not interfere with bottom surfaces 12 of groups 2.

Groups 2 are advanced one after the other parallel to direction X on conveying surfaces 9, 11, 10 of conveyors 6, 8, 7 respectively.

In particular, as groups 2 are advanced by conveyor 8, at first respective portions 13 of relative bottom surfaces 12 are advanced by conveyor 50 while respective portions 14 are advanced by conveyor 8 at the same speed of conveyor 50.

On the basis of the shape of the layer to be formed by manipulating means, it is necessary to rotate some of groups 2 of ninety degrees about axis Z.

As sensor 70 detects the passage of groups 2, control unit 72 evaluates if it is necessary to rotate groups 2 about axis Z in order to achieve the desired shape of the layer.

In the following of the present description, reference will be made to only one group 2 which needs to be rotated from a position in which smaller sides 17 are parallel to axis Y and larger sides 18 are parallel to direction X to a position in which smaller sides 17 are parallel to direction X and larger sides 18 are parallel to axis Y (see FIGS. 1 to 4).

On the basis of the signal generated by sensor 70, control unit 72 controls motor 22 in such a way to displace pad 16 in the first configuration (FIG. 10), in which portions 20, 21 protrude from conveying surface 11.

As a result, portion 13 slides at first on ascendant portion 20 of pad 16 and then on portion 21 of pad 16.

Due to the fact that pad 16 is stationary relative to direction X, portion 14 is braked relative to portion 13 of bottom surface 12. Accordingly, group 2 begins to rotate about axis Z.

In particular, motor 22 drives in rotation shaft 26 and lever 24 about axis D eccentric with respect to shaft 26. The rotation of lever 24 causes the displacement of lever 23 parallel to axis Z and, therefore, the inclination of lever 19 and pad 16 about axis E.

When portion 14 of bottom surface 12 contacts pad 16 set in the first configuration, the weight of group 2 causes the oscillation of pad 16 parallel to axis A (FIG. 10).

This oscillation is contained by stop elements 28.

When sensor 71 has detected that group 2 has been rotated around axis Z for ninety degrees, control unit 72 controls motor 60 in such a way to move back pad 16 in the second configuration (FIG. 9), in which portions 20, 21 are offset from conveying surface 11 and, therefore, do not contact the advancing next group 2.

Rotated group 2 advances on conveyors 8, 51 up to reach conveyor 7.

In case groups 2 having the larger format (FIGS. 5 and 6) are fed to conveyors 6, 8, 7, deviator 85 is set in the first position, in which it contacts groups 2 in rotation on pad 16 and eases the rotation thereof.

From an analysis of the features of orienting device 1 and of the method according to the present invention, the advantages it allows to obtain are apparent.

In particular, pad 16 is free to oscillate around axis A.

Thus, when pad 16 is set in the first configuration and bottom surfaces 12 of group 2, it is possible to more effectively guide groups 2 than in the known solution which have been discussed in the introductory part of the present description.

Accordingly, it is possible to increase the reliability of the rotation of groups 2, even at high conveying speed and/or when the shape of bottom surface 12 is particularly uneven, e.g. when the shape is a petaloid.

Furthermore, portions 20, 21 of pad 16 are respectively ascending and orthogonal to axis Z, when pad 16 is in the first configuration (FIG. 10).

Accordingly, portion 13 of bottom surface 12 of groups travelling on pad 16 is evenly guided, thus avoiding sudden impacts which could affect the precision and the repeatability of the rotation of groups 2, especially in case of uneven shape of bottom surface 12.

Furthermore, portions 20 and portions 21 of pad 16 have a length parallel to direction X and a width parallel to direction Y. In this way, it is possible to achieve a greater contact surface than in the known solutions which have been discussed in the introductory part of the present description.

Furthermore, motor 22 is an electric motor. Accordingly, different from the known solution using a pneumatic cylinder, it is possible to control pad 16 during the movement from the second configuration to the first configuration in such a way to maintain portions 13 of bottom surfaces 12 adherent on pad 16.

Finally, orienting device 1 comprises a sensor 71 for sensing the orientation of groups 2 about axis Z when groups 2 contact pad 16 and for generating the second signal associated to the fact that the rotation of groups 2 has been completed. Control unit 72 displaces pad 16 from the first configuration to the second configuration, on the basis of the second signal.

In this way, it is ensured that pad 16 is moved back in the second configuration, only when the rotation of groups 2 about axis Z is completed.

Clearly, changes may be made to orienting device 1 and to the method as described and illustrated herein without, however, departing from the scope of protection as defined in the accompanying claims.

In particular, orienting device 1 could comprise at least two conveying lines formed each by conveyors 8, 50, 51 and arranged side by side parallel to direction Y.

Still more precisely, pads 16 of adjacent conveying lines could be interposed between conveyors 8, proceeding parallel to direction Y.

Furthermore, pad 16 could be movable about direction X, but with a speed different than the speed of conveying surface 11 of conveyor 8.

End station 3 could be a station for de-palletizing a pallet of objects 2.

Infeed conveyor 6 could advance groups 2 with sides 17, 18 extending parallel to direction Y, X respectively.

Finally, objects 2 could be filled with detergent substances, e.g. shampoo, or with any other kind of solid or liquid substance. Objects 2 could also have another shape from the rectangular one, e.g. they could be square shaped.

The invention claimed is:

1. An orienting device (1) for orienting at least one object (2), comprising:
   a fixed frame (5);
   conveying means (8, 50, 51) defining a conveying surface (11, 52, 53) adapted to contact a bottom portion (12) of said object (2) and convey said object (2) along a first direction (X); and
   rotating means (15) selectively actuatable for creating on said bottom portion (12) a differential speed causing the rotation of said object (2) about a first vertical axis (Z) transversal to said first direction (X);
   said rotating means (15) comprising a contact element (16), which is either fixed or movable along said first direction (X) with a differential speed relative to said conveying means (8, 50, 51);
   said contact element (16) being selectively movable with respect to said conveying surface (11) between:
   a first configuration, in which it protrudes from said conveying surface (11) along said first axis (Z), so as to contact, in use, said bottom portion (12) of said object (2) and to cause the rotation of said object (2) about said first axis (Z); and
   a second configuration, in which it is offset from said conveying surface (11) along said first axis (Z);
   wherein said contact element (16) is free to oscillate around a second axis (A) parallel to said first direction (X),
   wherein said contact element (16) is hinged to said frame (5) about at least one third axis (E, B), which is transversal to said first axis (Z) and to said second axis (A),
   the orienting device further comprising a first lever (25) hinged to said frame (5) about a fourth axis (F) parallel to said third axis (E) and directly or indirectly hinged to said contact element (16) about said third axis (E).

2. The orienting device of claim 1, further comprising at least one first said joint (27) configured to allow oscillation of said contact element (16) around said second axis (A) wherein said joint (27) is directly or indirectly interposed between said first lever (25) and said contact element (16).

3. The orienting device of claim 1, wherein said contact element (16) comprises a first and a second portion (20, 21) sloped with respect to one another;
   said first portion (20) being arranged upstream of said second portion (21) with reference to the advancing direction of said object (2) on said conveying surface (11).

4. The orienting device of claim 3, wherein said contact element (16) is set in said first configuration, said second portion (21) lies on a plane orthogonal to said first axis (Z) and said first portion lies (20) on an ascending plane, proceeding according the advancing direction of said conveying surface (11).

5. The orienting device of claim 1, further comprising:
   at least one first motor (22), in particular an electric motor;
   a third lever (23), which is directly or indirectly hinged to said contact element (16); and
   a fourth lever (24), which is operatively connected to said first motor (22) and to said third lever (23).

6. The orienting device of claim 5, further comprising at least one second said joint (27) configured to allow oscillation of said contact element (16) around said second axis (A) wherein said joint (27) is directly or indirectly interposed between said third lever (23) and said contact element (16).

7. The orienting device of claim 1, wherein said conveying means (8, 50, 51) comprises:
   a first conveyor (8);
   at least one pair of second conveyors (50, 51), consecutive with one another parallel to said first direction (X), spaced with respect to one another parallel to said second axis (Y) and parallel to said first conveyor (8);
   said contact element (16) being interposed between said second conveyors (50, 51) along said first direction (X).

8. The orienting device of claim 7, further comprising:
   a second motor (60) which drives, in use, said first conveyor (16);
   a first transmission group (61, 62) for operatively connecting said second motor (60) and one (51) of said second conveyors (50, 51), so as to drive said one (51) of said second conveyors (50, 51); and/or
   a second transmission group (64) for operatively connecting said one (51) and said other one (50) of second conveyors (50, 51) with one another, so as to drive said second conveyors (50, 51) either with the same speed or with different speed from one another.

9. The orienting device of claim 1, further comprising:
sensing means (71) for sensing the orientation of said object (2) about said first axis (Z) when said object (2) contacts, in use, said contact element (16), and for generating a signal associated to the fact that said object (2) has been rotated about said first axis (Z) for a given rotation angle; and
a control unit (72) programmed for displacing said contact element (16) from said first configuration to said second configuration, on the basis of said signal generated by said sensing means (71).

10. A method of orienting at least one object (2), with an orienting device as claimed in claim 1, comprising:
  i) conveying said object (2) along a first direction (X) and with a bottom portion (12) lying on a conveying surface (11, 52, 53); and
  ii) selectively creating on said bottom portion (12) a differential speed causing the rotation of said object (2) about a first axis (Z) transversal to said first direction (X);
said step ii) comprising the steps of:
  iii) advancing said bottom portion (12) on a contact element (16), which is either fixed or movable along said first direction (X) with a differential speed relative to said conveying means (8, 50, 51);
  iv) selectively moving said contact element (16) with respect to said conveying surface (11, 52, 53) between:
    a first configuration, in which it protrudes from said conveying surface (11, 52, 53) along said first axis (Z), so as to contact, in use, said bottom portion (12) of said group (2) and to cause the rotation of said group (2) about said first axis (Z); and
    a second configuration, in which it is offset from said conveying surface (11, 52, 53) along said first axis (Z);
  v) leaving said contact element (16) free to oscillate about a second axis (A) parallel to said first direction (X), when said bottom portion (12) of said object (2) contacts said contact element (16).

11. The method of claim 10, wherein said contact element (16) comprises a first and a second portion (20, 21) sloped with respect to one another;
said first portion (20) being arranged downstream of said second portion (21) with reference to the advancing direction of said object (2) on said conveying surface (11, 50, 51);
said step iv) consisting of setting said first portion (20) and second portion (21) in a position in which they protrude from said conveying surface (11, 50, 51), so as to contact said bottom portion (12) of said object (2), when said contact element (16) is in said first configuration; said second portion (21) lying on a plane orthogonal to said first axis (Z) and said first portion (20) lying on an ascending plane, proceeding according the advancing direction of said conveying surface (11, 50, 51);
said contact element (16) being set in said first configuration during said step ii).

12. A method of orienting at least one object (2), comprising the steps of:
  i) conveying said object (2) along a first direction (X) and with a bottom portion lying on a conveying surface (11, 50, 51); and
  ii) selectively creating on said bottom portion (12) a differential speed causing the rotation of said object (2) about a first axis (Z) transversal to said first direction (X);
said step ii) comprising the steps of:
  iii) advancing said bottom portion (12) on a contact element (16), which is either fixed or movable along said first direction (X) with a differential speed relative to said conveying means (8, 50, 51);
  iv) selectively moving said contact element (16) with respect to said conveying surface (11, 52, 53) between:
    a first configuration, in which it protrudes from said conveying surface (11, 52, 53) along said first axis (Z), so as to contact, in use, said bottom portion (12) of said group (2) and to cause the rotation of said group (2) about said first axis (Z); and
    a second configuration, in which it is offset from said conveying surface (11, 52, 53) along said first axis (Z);
  v) sensing the orientation of said object (2) with reference to said first axis (Z), when said object (2) contacts said contact element (16); and
  vi) displacing said contact element (16) from said first configuration to said second configuration, on the basis of the sensed orientation of said object (2) with reference to said first axis (Z).

* * * * *